United States Patent [19]

Ritter, II

[11] Patent Number: 4,474,745

[45] Date of Patent: Oct. 2, 1984

[54] PRODUCTION OF SPINEL POWDER

[75] Inventor: George W. Ritter, II, Newark, Ohio

[73] Assignee: Owens-Corning Fiberglas Corporation, Toledo, Ohio

[21] Appl. No.: 397,665

[22] Filed: Jul. 12, 1982

[51] Int. Cl.³ ............................................. C01F 7/16
[52] U.S. Cl. .............................. 423/600; 252/315.01; 252/315.1
[58] Field of Search .................. 423/600; 252/315.01, 252/315.1

[56] References Cited

U.S. PATENT DOCUMENTS 3,413,083  11/1968  Roendliker ........................... 423/600
3,946,102  3/1976  Thomas ................................ 423/600

FOREIGN PATENT DOCUMENTS 47-14337  4/1972  Japan .................................. 423/600

Primary Examiner—Herbert T. Carter
Attorney, Agent, or Firm—Ronald C. Hudgens; Philip R. Cloutier; Robert F. Rywalski

[57] ABSTRACT

A gel suitable for fiber formation is produced by reacting a Group II water soluble metal oxide with an aluminum chlorohydrate-organic complex to form a complex which is hydrolyzed and dried at elevated temperatures.

7 Claims, No Drawings

PRODUCTION OF SPINEL POWDER

TECHNICAL FIELD

This invention pertains to the production of sol-gel solutions.

In one of its more specific aspects, this invention pertains to the preparation of magnesium-containing complexes suitable for use in the production of films, molded products and fibers. The formation of gels containing such materials as alumina, silica, lithium, titanium, manganese, and magnesium for the production of fibers is well known.

STATEMENT OF THE INVENTION

There has now been developed a method of producing a spinel in the form of a water-based gel, which method is simple, rapid and which gel has been found to produce excellent films and molded products. This method comprises reacting a Group II water soluble metal oxide with an aluminum chlorohydrate-organic complex to form a salt-containing composite, and reacting the composite with an alkali to hydrolize the salts to the hydroxides. The hydroxides are then heated at elevated temperatures for a period sufficient to produce an oxide complex of the Group II metal and aluminum.

DESCRIPTION OF THE INVENTION

The method of this invention is generally applicable to the use of any Group II metal oxide or hydroxide, or mixtures thereof. In its preferred embodiment, it is particularly applicable to the use of magnesium oxide or magnesium hydroxide.

The aluminum chlorohydrate-organic complex will preferably be employed in the form of an aluminum chlorohydroxide-propylene glycol complex having an aluminum oxide content equivalent to approximately 36 weight percent, about 12.5 weight percent chloride, about 25 weight percent propylene glycol, with an Al:Cl atomic ratio in the range of from about 2:1 to about 1.9:1.

One particularly suitable aluminum chlorohydrate-glycol complex is commercially available as Rehydrol II from Rehies Chemical Company, Berkeley Heights, N.J. However, any suitable aluminum chlorohydrate-organic complex can be employed as, for example, one containing propylene or ethylene glycol.

The composite can be reacted with any suitable hydroxide to hydrolize the salts to the hydroxides. Ammonium hydroxide is preferred.

The Group II metal oxide or hydroxide is optionally dissolved in any suitable quantity of water which contains a glycol, such as polyethylene glycol in an amount of about 2 weight percent.

The aluminum chlorohydrate is mixed with water in an amount of about 2 parts by weight to about 1 part by weight of water and 3 parts by weight of isopropanol.

The alkali is employed as about a 30 weight percent aqueous solution in an amount of about 100 parts by weight per about 14 parts by weight of Group II metal oxide, that is, in a quantity of alkali to convert the chlorine of the organic chloride to a volatile alkali chloride.

In general, the aqueous slurry of the Group II metal oxide or hydroxide is added, with agitation, to the organic complex and the gel is allowed to form while being agitated.

The solidified gel is broken down and to it is added a slurry of the hydroxide to hydrolize all salts to their respective hydroxides.

The resulting material is dried, pulverized and heated for a sufficient time at a sufficient temperature to burn out the organic matter and volatilize the alkali chlorides.

The resultant material is then heated up to about 2700° F. over a period of about 20 hours after which it is cooled.

The method of this invention is demonstrated in greater detail by the following examples.

EXAMPLE I 99 g. of Rehydrol II, 150 g. of isopropanol and 50 g. of distilled water were combined to form a first mixture.

14 g. of magnesium oxide, 500 g. of water and 10 g. polyethylene glycol (6,800 mw) were combined to form a second mixture.

The two mixtures were combined while mixing and after 90 seconds, a thick gel had formed.

The gel was broken down with high-shear mixing and to the resulting composite was added 10 ml. ammonium hydroxide in 90 ml. water. The resulting product was transferred to several ceramic drying dishes and oven dried for about 16 hours at 125° C.

The resulting charred gels were pulverized and heated at 1300° F. for about 19 hours. A white powder determined to be $MgAl_2O_4$, or magnesium aluminate spinel was produced.

EXAMPLE II

Two mixtures, formed as in Example I, were combined as previously and a thick gel was formed.

The gel was broken down and to the resulting composite was added 30 ml. ammonium hydroxide in 70 ml. water. The resulting product was oven dried and then fired as described in Example I.

As a result of the above examples, it has been determined that, preferentially, the pulverized gel should be heated from about 1600° F. to about 2320° F. in about 2 hours, from about 2320° F. to about 2700° F. in about 4 hours at which temperature it is held for about 15 hours and after which it is cooled to about 1600° F. in about 4 hours.

It will be evident from the foregoing that various modifications can be made to this invention. Such, however, are considered within the scope of this invention.

I claim:

1. A method of producing magnesium aluminate spinel which comprises reacting magnesium oxide or hydroxide with an aluminum chlorohydrate-glycol complex to form a magnesium aluminum salt-containing composite in the form of a gel, reacting the composite with an alkali to hydrolize the salt to the hydroxide and heating the hydroxide at elevated temperatures to form magnesium aluminate spinel powder.

2. The method of claim 1 in which said complex has an aluminum oxide content of about 36 weight percent, a chloride content of about 12.5 weight percent, and a propylene glycol content of about 25 weight percent with an Al to Cl atomic ratio in the range of from about 2 to 1 to about 1.9 to 1.

3. The method of claim 1 in which said alkali is ammonium hydroxide.

4. The method of claim 1 in which said hydroxide is heated to about 2700° F. for a period of about 20 hours.

5. The method of claim 1 in which aluminum chlorohydrate is reacted with propylene glycol to form said complex.

6. The method of claim 1 in which said hydroxide is heated to about 1300° F. for about 19 hours.

7. The method of claim 1 in which said hydroxide is heated from about 1600° F. to about 2320° F. in about 2 hours, from about 2320° F. to about 2700° F. in about 4 hours and held at about 2700° F. for about 15 hours and cooled to about 1600° F. in about 4 hours.

* * * * *